H. B. WALTER.
CUTTING BLADE FOR STAPLING MACHINES.
APPLICATION FILED FEB. 19, 1918.
1,342,240.
Patented June 1, 1920.
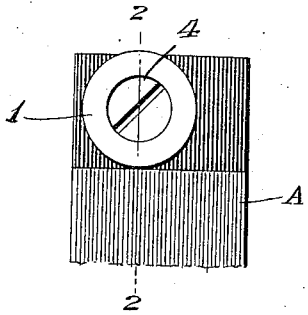
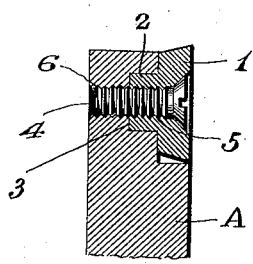
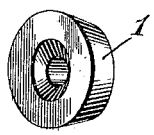
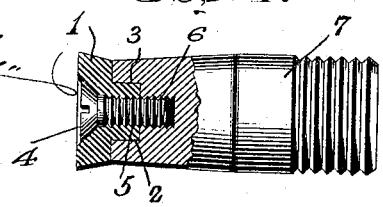
Witnesses
Inventor
Harrison B. Walter
by
His Attorneys

UNITED STATES PATENT OFFICE.

HARRISON B. WALTER, OF PHILADELPHIA, PENNSYLVANIA.

CUTTING-BLADE FOR STAPLING-MACHINES.

1,342,240.   Specification of Letters Patent.   Patented June 1, 1920.

Application filed February 19, 1918. Serial No. 218,139.

*To all whom it may concern:*

Be it known that I, HARRISON B. WALTER, a citizen of the United States, residing at Philadelphia, in the county of Philadelphia and State of Pennsylvania, have invented certain new and useful Improvements in Cutting-Blades for Stapling-Machines, of which the following is a specification.

My invention relates to an improvement in cutting blades for stapling machines.

In the various types of wire stapling machines which cut off, form and drive staples, for example at the rate of from one hundred and fifty to two hundred staples per minute, the cutting blades now in use are of a generally rectangular shape, and at the speed noted they are required to cut off in ten working hours from ninety thousand (90,000) to one hundred twenty thousand staples. This amount of work renders it difficult to maintain a uniformly sharp cutting edge, which becomes dull, and requires removal of the cutting blade at frequent intervals so that it can be sharpened.

It is obvious that a cutting blade of rectangular form can present an effective cutting edge at one point only, and after several sharpenings the blade is not of proper size to perform the cutting-off function at the correct time as regards other operations of the machine, and this means that new blades must be provided.

Furthermore, in the use of the rectangular cutting blades, it is necessary not only that they be removed but taken to a grinding-wheel or stone and sharpened, and it is difficult to hold them in the hand, or in a fixed position with a tool, and to sharpen the edges accurately to a true line as required in the work they are to perform.

My improvement consists of a circular cutting blade which is so attached to the moving frame by a round lug on the cutter inserted in a socket of corresponding size and shape in the machine that it takes the strain from the screw which holds the cutter in position.

With this round cutter, it is possible by slightly releasing the retaining screw, to revolve it so that a new point is repeatedly presented to accomplish the cutting, and consequently its entire circumference is capable of being utilized for cutting purposes, so that when it becomes dull at one point it is slightly turned to present a perfect cutting edge for its further work.

With my improved cutter, it is possible also—when the entire circumference of the cutter has become dull—to remove the same and by attaching it to a stud or other support it can be quickly put into a lathe and revolved rapidly, and by holding a fine stone to the edge of the cutter, or a piece of emery cloth, the circular cutter can be easily and effectively sharpened on its entire circumference, or, if no lathe is convenient, it is possible to attach the stud or pin (to which the cutter is fastened) to the end of the motor shaft which drives the stapling-machine. In this way, it can be rapidly revolved, and the sharpening process performed as previously described.

In the accompanying drawings:—

Figure 1 is a view in side elevation of the cutter;

Fig. 2 is a section on line 2—2 of Fig. 1.

Fig. 3 is a view in perspective of the circular cutter; and

Fig. 4 is a view of a stud to which the cutter may be attached, and by which it may be held while being sharpened.

A, represents a fragment of a moving frame of any type of stapling machine, as this improvement can be applied to various forms of stapling machines. The numeral 1 is a circular cutter having a beveled edge to increase its cutting efficiency; and 2 indicates a circular stud, which is not essential but preferable, and adapted to fit a circular socket 3 which takes the strain from the screw 4, which passes through a hole 5 in the cutter and screws into the threads 6 in the hole in the moving frame. By loosening the screw, the cutter may be re-set at any time, that is to say turned never so slightly to present a new cutting point, whereupon the screw is again tightened to hold the cutter rigidly in place.

This is repeated as often as a new point on the circumference of the cutter is to be presented for work, and until the entire edge has been used, after which the cutter may be removed and attached to a stud 7, or equivalent device to be placed in a lathe or other turning machine in order to facilitate the sharpening of the edge of the cutter, as mentioned in the preliminary part of the specification.

I claim:

1. The combination with a support having a circular socket therein, of a circular cutter having a stud integral therewith, which fits and is capable of being turned and adjusted in the socket, the socket and stud arranged transversely of the direction of travel of the support, and means extending through the blade for securing it in its adjusted position against turning.

2. The combination with a support having a circular socket and a recess therein, of a circular cutter received within said recess and provided with an integral stud which fits in and is capable of being adjusted in the socket, the cutter, stud and support having alined holes arranged transversely of the direction of travel of the support, and means extending through the alined holes for securing the blade in its adjusted position against turning.

In testimony whereof I affix my signature.

HARRISON B. WALTER.